US009008484B2

(12) United States Patent
Takeuchi et al.

(10) Patent No.: US 9,008,484 B2
(45) Date of Patent: Apr. 14, 2015

(54) OPTICAL SWITCH (75) Inventors: Kenichiro Takeuchi, North Brunswick, NJ (US); Qin Zhang, San Jose, CA (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 339 days.

(21) Appl. No.: 13/432,454

(22) Filed: Mar. 28, 2012

(65) Prior Publication Data

US 2013/0259422 A1  Oct. 3, 2013

(51) Int. Cl.
*G02B 6/38* (2006.01)
*G02B 6/44* (2006.01)
*H01R 13/62* (2006.01)

(52) U.S. Cl.
CPC .............. *G02B 6/3826* (2013.01); *H01R 13/62* (2013.01)

(58) Field of Classification Search
CPC .................... G02B 6/3826; G02B 6/4461
See application file for complete search history.

(56) References Cited

U.S. PATENT DOCUMENTS

| | | | |
|---|---|---|---|
| 2,865,979 A | 12/1958 | Klassen | |
| 4,688,885 A | 8/1987 | Poteat et al. | |
| 5,613,021 A | 3/1997 | Saito et al. | |
| 5,775,755 A | 7/1998 | Covert et al. | |
| 6,327,139 B1 | 12/2001 | Champion et al. | |
| 6,356,697 B1 | 3/2002 | Braga et al. | |
| 7,335,056 B1 | 2/2008 | Clark et al. | |
| 7,746,667 B1 | 6/2010 | Baiza et al. | |
| 8,068,715 B2 | 11/2011 | Kewitsch | |
| 8,175,425 B2 | 5/2012 | Chen | |
| 2002/0117942 A1 | 8/2002 | Audibert et al. | |
| 2004/0074852 A1 | 4/2004 | Knudsen et al. | |
| 2006/0018622 A1 | 1/2006 | Caveney et al. | |
| 2006/0162948 A1 | 7/2006 | Rinderer et al. | |
| 2008/0002937 A1 | 1/2008 | Spisany et al. | |
| 2009/0078834 A1 | 3/2009 | Chen et al. | |
| 2009/0086441 A1 | 4/2009 | Randall et al. | |
| 2010/0008623 A2 | 1/2010 | Arol et al. | |
| 2010/0054659 A1 | 3/2010 | Pnini et al. | |
| 2010/0220964 A1* | 9/2010 | de Jong et al. | 385/100 |
| 2010/0310221 A1 | 12/2010 | Le Dissez | |
| 2012/0019117 A1 | 1/2012 | Dunwoody et al. | |
| 2012/0321255 A1 | 12/2012 | Kewitsch | |

FOREIGN PATENT DOCUMENTS

EP  0207926 A2  1/1987
EP  0795935 A2  9/1997

OTHER PUBLICATIONS

International Search Report for Application No. PCT/US2013/023176 dated Jun. 27, 2013.

(Continued)

*Primary Examiner* — Jerry Rahll (74) *Attorney, Agent, or Firm* — Lerner, David, Littenberg, Krumholz & Mentlik, LLP (57) ABSTRACT An N×N switching apparatus for optical components is provided. A switching apparatus includes a first element that provides for a supply of a length of optical fiber in tension and has an interface component for maintaining an end of the optical fiber in tension at a first position. The switching apparatus further includes a second element that has a coupling component for detachably maintaining the end of the optical fiber at a second position. The first and second elements are arranged such that the end of the optical fiber is movable between the first and second elements.

16 Claims, 8 Drawing Sheets

(56) References Cited

OTHER PUBLICATIONS

Partial International Search Report for Application No. PCT/US2013/023176 dated May 2, 2013.
Partial International Search Report for Application No. PCT/US2013/033701 dated Jul. 11, 2013.
International Search Report and Written Opinion for Application No. PCT/US2013/033701 dated Sep. 2, 2013.
International Search Report and Written Opinion for Application No. PCT/US2014/021953 dated Jun. 25, 2014.

* cited by examiner

OPTICAL SWITCH

BACKGROUND OF THE INVENTION

The present invention relates to systems for conveying energy signals including optical signals and electrical signals, and more particularly, to optical switching systems for enabling reconfiguration of connections between optical signal conveying media, such as between optical fiber cables or between optical fiber cables and optical signal components.

An optical switch provides a means for selectively switching an optical signal conveying media through which optical signals are being conveyed from one optical signal conveying media, such as an optical fiber or waveguide, to another optical signal conveying media. A variety of approaches have been utilized to provide this switching capability. For instance, in a microelectromechanical systems (MEMS) approach, an array of micromirrors may be used to deflect beams of light to a predetermined output fiber. In other systems, piezoelectric ceramics and even acoustic waves have been used to deflect light beams between sets of fibers.

As further described in U.S. Pat. No. 8,068,715 to Kewitsch, the disclosure of which is hereby fully incorporated by reference herein, robotic approaches for "cross-connecting" pairs of optical fibers have been developed to reduce the negative effects of the aforementioned so-called "non-robotic" approaches such as insertion loss, back-reflection and crosstalk of the signals. These approaches can be utilized for switch matrices having N columns and N rows (N×N) and thus provide greater scalability than non-robotic approaches.

Current robotic approaches, however, have limitations. Conventionally, direct connections need to be made between optical fiber cables in such systems. The cross-connecting of the cables in these systems leads to an entangled web of cables, which may prevent further switching of connections between the cables. Some systems limit the range of movement of cables while other systems require careful planning of each cable connection to reduce the possibility of entanglement.

Therefore, there exists a need for system and method that can switch connections between media, such as optical fiber cables, through which energy signals may be conveyed and avoids entanglement of cables from impacting the capability to perform switching of connections.

BRIEF SUMMARY OF THE INVENTION

In accordance with one aspect of the invention, an N×N switching apparatus for optical components may include a first element that provides for a supply of a length of optical fiber in tension. The first element may include an interface component for maintaining an end of the optical fiber in tension at a first position. The switching apparatus further may include a second element that has a coupling component for detachably maintaining the end of the optical fiber at a second position. The first and second elements may be arranged such that the end of the optical fiber is movable between the first and second elements.

In accordance with another aspect of the invention, a cover for an optical fiber, in which the fiber has a connector at an end adjacent to a predetermined portion of a length of the optical fiber, may include a series of segments including a first segment and at least a second segment that is connected to and overlaps the first segment to allow the first segment to be moved into and extend away from the second segment. The series of segments may be adapted to receive the optical fiber that extends through the series such that when the optical fiber is received in the series of segments, the first segment may be adjacent to the connector at the end of the optical fiber and may enclose the predetermined portion of the optical fiber.

In accordance with another aspect of the invention, a switching system for optical components may include a control unit to control engagement of an engagement element with an end of a predetermined optical fiber in which the optical fiber may be adapted for coupling to an N×N optical switch under tension force. The optical fiber may be coupled to a plurality of optical fibers including the predetermined optical fiber. The control unit may control movement of the engagement element engaged with the end of the predetermined optical fiber against the supplied tension force between a predetermined first position to a predetermined second position of the optical switch. The tension force may be maintained during the movement.

In accordance with another aspect of the invention, a process for switching connections between optical components of an N×N array of optical components may include a step of supplying a length of optical fiber in tension from a first element that includes an interface component. The process further may include a step of maintaining an end of the optical fiber in tension at a first position at the interface component. The process further may include a step of transitioning the optical fiber from the first position to a second position at a second element. The process further may include a step of inserting the optical fiber into a coupling component of the second element that is for detachably maintaining the end of the optical fiber at the second position.

DETAILED DESCRIPTION

Figure 1:
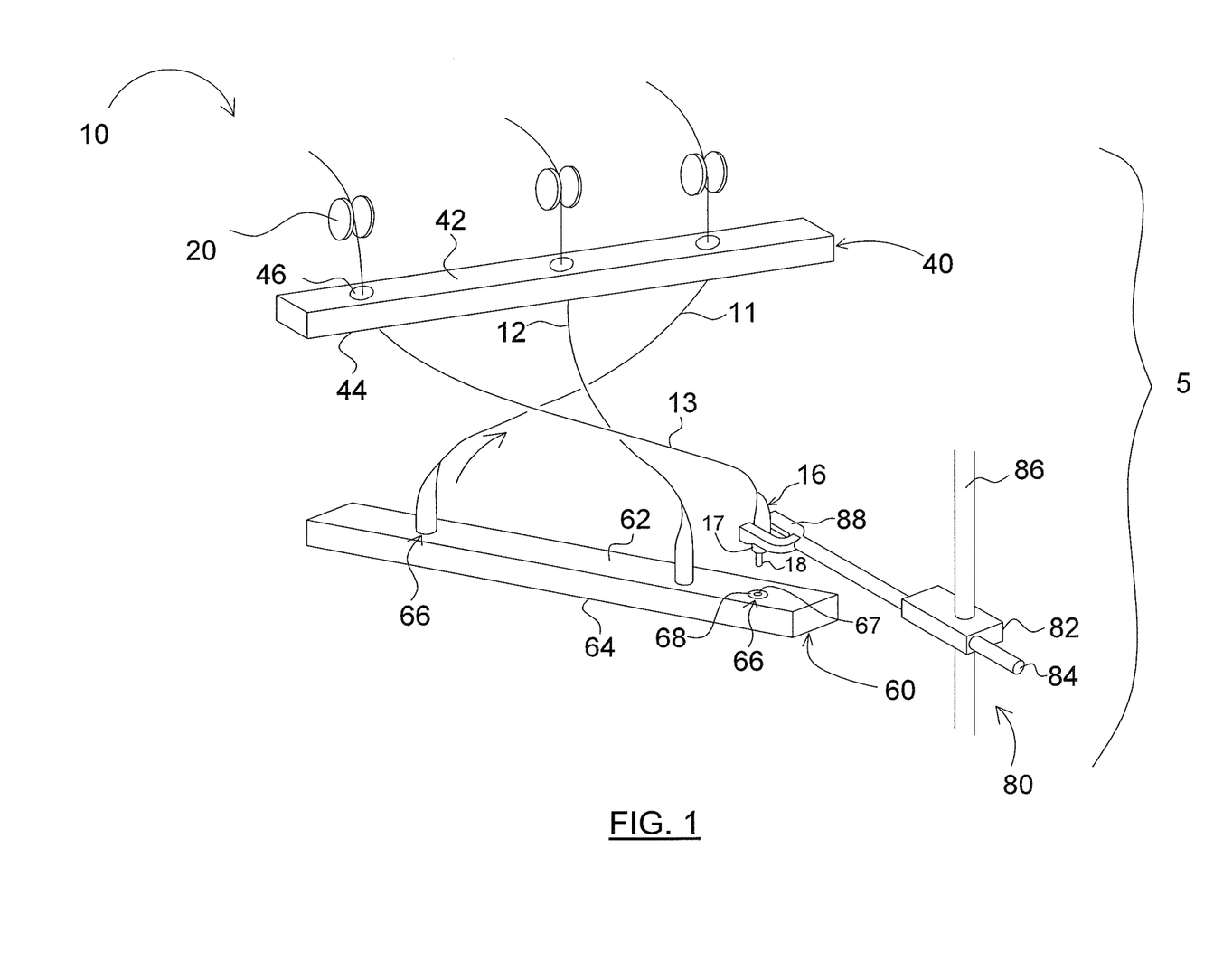
FIG. 1 is a perspective view of a switching system in accordance with an embodiment of the invention.

Referring to FIG. 1, in certain embodiments in accordance with the present invention, a switching system 5 may have an N×N switching apparatus 10 and a control unit 80. The switching apparatus 10 may have first and second elements 40, 60 each having a generally thin and longitudinal profile that lie in substantially parallel planes. The first and second elements 40, 60 may be rigidly or pivotably attached to a housing (not shown) surrounding the switching apparatus 10 or to a rigid framework (also not shown). The first element 40 may have a first outer portion 42 and a first inner portion 44 opposite the first outer portion 42. A set of holes 46 each spaced a distance from one another and sized to receive an appropriate cable, such as an optical fiber, may pass through the first element 40. A tensioning mechanism of a series of tensioning mechanisms, such as the spooling mechanism 20 shown in FIG. 1, may provide a supply of a length of optical fiber in tension to a corresponding hole of the set of holes 46. In this manner, a first cable 11, a second cable 12, and a third cable 13 may pass through respective holes 46 of the first element 40 and be held in tension by a force along the cable in a direction away from the outer portion 42. Each of these cables may have a connector 16 at their ends. Each of the connectors 16 may have a body 17 and a tip 18 at the very end of the body 17. In preferred embodiments, the connectors 16 may have the same diameter as the cables to which they are attached.

The second element 60 may have a second inner portion 62 and a second outer portion 64 opposite the second inner portion 62. Connector interfaces 66 of the same number as the number of holes 46, or of a lesser or greater number than the number of holes 46, may be located on the second inner portion 62 of the second element 60. Each of the connector interfaces 66 may have a mating surface 68 adapted to contact the body 17 of the connector 16 and an inner portion 67 for receiving the tip 18 of each of the connectors 16. Although not shown, in alternative embodiments, the connectors 16 may be female connectors that surrounding a protruding male portion of a connector interface.

Each of the connectors 16 may be movable from the hole of the set of holes 46 through which the attached cable passes through to a selected connector interface 66. Each of the holes 46 may be sized such that the connector 16 cannot pass from the first inner portion 44 to the first outer portion 42 of the first element 40. In this manner, based on the operation of the tensioning mechanism as described below, each of the cables are maintained in tension when the connectors 16 are at a first position near or in contact with the first element 40. The connectors 16 may be inserted into the connector interface 66 to form an interface between each of the cables and the second element 60 when the tip 18 contacts the inner portion 67 of the connector interface 66, so as to form an electrically conductive or optical signal transmission interconnection. The connector 16 may be held within the connector interface 66 through a number of mechanical or electromagnetic interfaces. In the arrangement shown, the mating surface 68 of the connector interface 66 may be magnetized such that upon insertion of the connector 16 into the connector interface 66, the magnetic force of the mating surface 68 overcomes the tension in the cable, which is in the direction away from the connector 16. In a preferred arrangement, the tension in the cables may preferably be in the range of 0.1 N to 19 N and the magnetic force provided by the mating surface 68 may be a force greater than the tension in the cables that is preferably in the range of 0.2 to 20 N. Upon release of the connector 16 from the connector interface 66 of the second element 60, the cable may retract toward the first element 40 due to the tension being applied to the corresponding cable.

When the switching apparatus 10 has multiple cables as in the example shown in FIG. 1 upon retraction of the connector 16 toward the first element 40, friction may be induced between the cable being retracted and other cables connected to the second element 60. For example, the first cable 11 and the third cable 13 may be connected to the second element 60 when it is desired to retract the second cable 12. In this instance, the second cable 12 and the connector 16 thereon may frictionally contact the first cable 11 and the third cable 13 during retraction toward the first element 40.

Various methods may be utilized to reduce the amount of friction during the retraction of each of the cables. For example, a coating of polytetrafluoroethylene, such as Dupont TEFLON®, may be provided along the length of the cables to reduce this friction. In another example, the first element 40 and the second element 60 may rotate relative to one another within their respective parallel planes to enable repositioning of the cables relative to one another to reduce the friction between two cables by reducing the opposing sliding forces between the two cables or even eliminating the friction when the cables no longer contact each other at the relative angle at which the first and second elements 40, 60 are rotated. In still another example, the tension on the cable provided by the spooling mechanism 20, which may be adjustable, may be increased to provide a higher force during retraction of the cable to overcome the sliding frictional forces.

As further shown in FIG. 1, a control unit 80 may be located adjacent to the switching apparatus 10. The control unit 80 may have a motion box 82 through which a guide rail 86 may pass in a vertical direction and an arm 84 may pass in a horizontal direction toward the switching apparatus 10. In this manner, the motion box 82 may slide along the guide rail 86 and may further rotate about the guide rail 86. Furthermore, the arm 84 may slide toward the switching apparatus 10 or away from the switching apparatus 10. In the example shown in FIG. 1, each of these movements may occur simultaneously such that the arm 84 may be rotated toward the switching apparatus 10 while also extending toward the switching apparatus 10.

An engagement element 88 may extend from the arm 84. The engagement element 88 may include two prongs extending from the arm 84 and separated from one another to allow for placement of a portion of the connector 16 between the prongs. Although not shown in great detail in FIG. 1, an inner portion of the prongs may be tapered such that, as the connector 16 is inserted into the prongs, the prongs apply a compressive force against the connector 16. The compressive force may be sufficient to overcome the magnetic forces between the connector interface 66 and the connector 16 such that, upon raising the arm 84 along the guiderail 86, the connector 16 disengages from the connector interface 66.

In an alternative embodiment, the engagement element 88 may engage the connector 16 through a magnetic engagement in which both the engagement element 88 and the connector 16 have magnetic elements that attract one another. In another alternative, each of the prongs of the engagement element 88 may rotate about a pin such that the prongs, when rotating toward one another, grip and maintain the connector 16. In any of these alternative embodiments, it is to be understood that the force applied by the engagement element 88 on the connector 16 is sufficient such that, upon raising the arm 84 along the guide rail 86, the connector 16 disengages from the connector interface 66.

Figure 2:
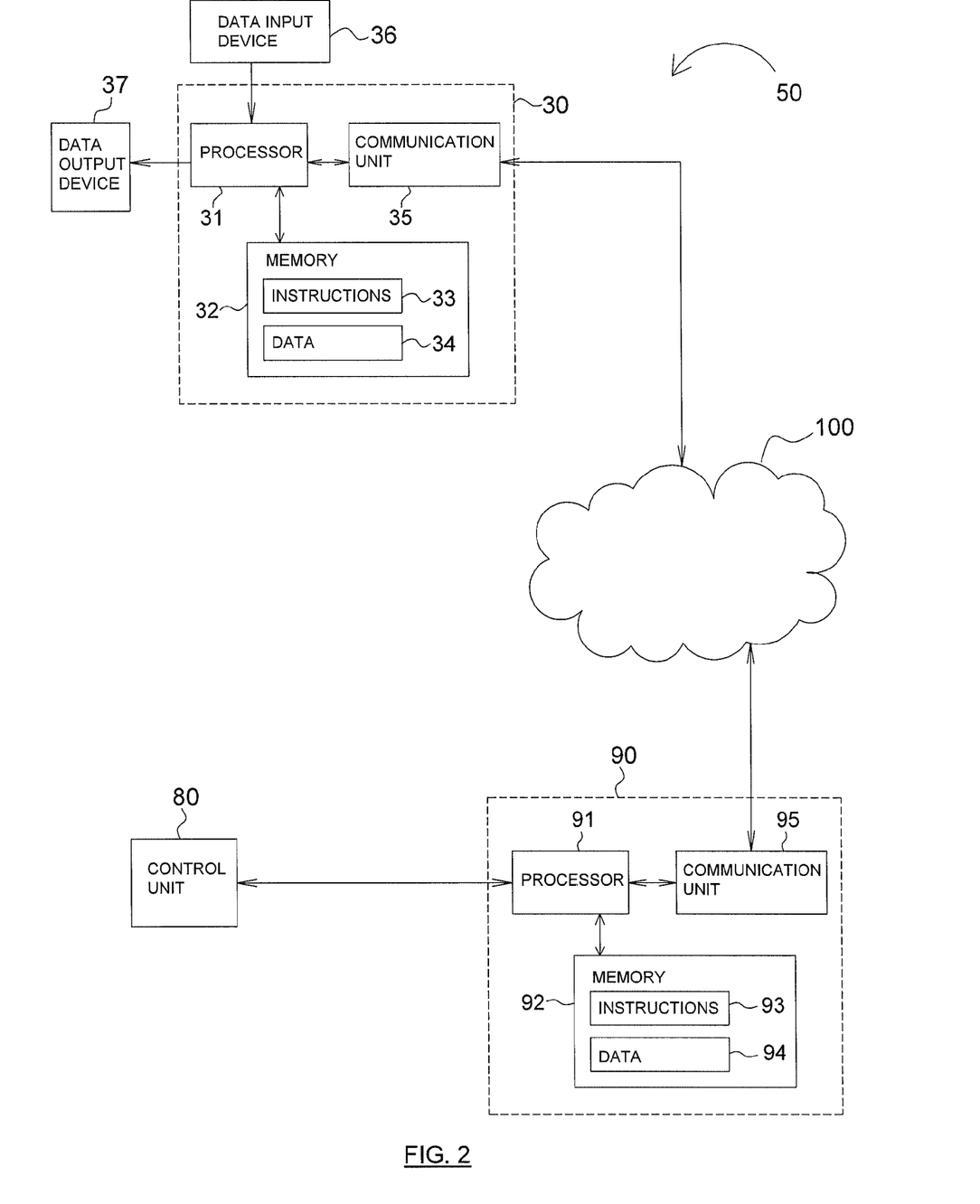
FIG. 2 is a schematic diagram of a control system for use with the switching system of FIG. 1.

As shown in FIG. 2, the switching system 5 may further include a control system 50 adapted for controlling the movement of the control unit 80. The control system 50 may include at least one first computer system 30, and at least one second computer system 90. These computer systems 30 and 90 may send and receive information via a network 100 or, in some embodiments, directly to one another. Further computer systems 30 and computer systems 90 may also send and receive information via the network 100 as part of fault tolerant, or backup, systems. For example, a first user may generate instructions at the first computer system 30 which may be distributed via the network 100 to the second computer system 90 for instructing movement of the arm 84.

The network 100, and intervening communication points, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces. Although only a few devices are depicted in FIG. 2, a typical system may include a large number of connected computers, with each different computer being at a different communication point of the network.

Each of the computer systems 30 and 90 may include a processor, a memory, and a communication link. For example, the computer system 30 may include memory 32 which stores information, such as data or instructions, accessible by a processor 31 which may manipulate the information. A communication unit 35 may, as instructed by the processor 31, send information to, and also passively or as instructed by the processor 31 receive, information from the communications unit 35. Likewise, the computer system 90 may include memory 92 which stores information accessible by a processor 91 which may manipulate the information. A communication unit 95 may, as instructed by the processor 91, send information to and also passively or as instructed by the processor 91, receive information from the communication unit 35. In this manner, the computer systems 30 and 90 may communicate to provide information with each other.

The processors 31 and 91 may be any conventional processor, such as commercially available CPUs. Alternatively, the processors may be dedicated controllers such as an ASIC, FPGA, or other hardware-based processor. Although shown in FIG. 2 as being within the same block, the processor and memory may actually comprise multiple processors and memories that may or may not be stored within the same physical housing. For example, memories may be a hard drive or other storage media located in a server farm of a network data center. Accordingly, references to a processor, memory, or computer will be understood to include references to a collection of processors, memories, or computers that may or may not operate in parallel.

The memories may include a first part storing applications or instructions 33 and 93 that may be executed by the respective processor. The instructions 33 and 93 may be any set of instructions to be executed directly (such as machine code) or indirectly (such as scripts) by the processor. In that regard, the terms "applications," "instructions," and "programs" may be used interchangeably herein. For example, the instructions 33 may include instructions for controlling the movement of the control unit 80 such as those described further herein. In another example, the instructions 94 may include a default mode for moving the control unit 80 in the case of a malfunction or disconnection between the computer systems 30 and 90.

The memories may also include a second part storing data 34 and 94 that may be retrieved, stored or modified in accordance with the respective instructions. The memory may include any type capable of storing information accessible by the processor, such as a hard-drive, memory card, ROM, RAM, DVD, CD-ROM, write-capable, and read-only memories or various combinations of the foregoing, where the applications 33, 93 and data 34, 94 are stored on the same or different types of media.

The data 34 and 94 need not be limited by any particular data structure. For example, the data may be stored in computer registers, in a relational database as a table having a plurality of different fields and records, or XML documents. The data may also be formatted into any computer-readable format such as, but not limited to, binary values, ASCII or Unicode. For instance, the order of placement of connectors within the second element may be recorded into a database, as described further herein. Moreover, the data may comprise any information sufficient to identify the relevant information, such as numbers, descriptive text, proprietary codes, pointers, references to data stored in other memories (including other network locations) or information that is used by a function to calculate the relevant data. For example, the data 34 of the first computer system 30 may include information such as the sequence of connections made between the connectors 16 of the each cable and the connector interfaces 66 of the second element 60 of the switching apparatus 10.

In addition to a processor, memory and instructions, in some embodiments, the computer systems 30 and 90 may communicate with all of the components used in connection with a personal computer through either wired or wireless connections. For example, as shown in FIG. 2, the computer system 30 may receive information, wirelessly or by wired communication links, from a data input device 36 such as a mouse, keyboard, touch screen, microphone, and smart phone and like devices, and may send information to a data output device 37 such as an electronic display (e.g., a monitor having a screen, a touch-screen, a projector, a television, a computer printer or any other electrical device that is operable to display information).

Referring again to FIG. 1, in operation, the first computer system 30 may transmit instructions through the network 100 to the second computer system 90 directing one or more movements of the control unit 80. Provided with these instructions, the motion box 82, controlled by the control unit 80, in one example, may slide upwardly along the guide rail 86 from a predetermined home position or from a last position of the motion box 82. Preferably, during the upward motion of the motion box, the arm 84 may be instructed to be rotated to a position outside the region of the switching apparatus 10 such that the arm 84 will not contact any of the cables of the switching apparatus 10. Once the arm 84 reaches a predetermined vertical position, the arm 84 may be instructed by the first computer system 30 to extend from the motion box 82 toward a cable, such as the third cable 13, that may be in a resting position adjacent to the first element 40. Once the engagement element 88 of the control unit 80 reaches this predesignated cable, the jaws of the engagement element 88 may expand around the connector 16 and may then surround the connector 16 to mechanically grip the connector. The first computer system 30 may then direct the control unit 80 to provide for movement of the engagement element 88 of the arm 84 and the motion box 82 to a position above a predesignated connector interface 66 for insertion of the connector 16. Once in this position, the motion box 82 may be instructed to slide downwardly along the guide rail 86 toward the predesignated connector interface 66 into which the tip 18 of the connector 16 may be inserted as described previously herein. In this manner, when other cables, such as the first cable 11 and the second cable 12, are inserted into the second element 60, the cable being connected to the second element 60 desirably overlaps any other cables previously inserted and possible entanglement with these previously inserted cables is avoided.

In one embodiment, after the engagement element 88 has engaged with, such as by gripping, the connector 16, the motion box 82 may only rotate and the arm 84 only extend or retract without any movement of the motion box 82 along the guide rail 86 such that no part of the arm 84 contacts any of the other cables of the switching apparatus 10.

Referring again to FIG. 2, in some embodiments, the processor 31 of the first computer system 30 may instruct recordation in the memory 32 of data 34 indicating the positions of any or all of the cables connected to the second element 60. Furthermore, the order in which connections are made by the cables with the second element 60 may additionally be stored within the data memory 34. As the placement of the cables into the second element 60 is a dynamic process, the relative positions of the cables in the second element 60 may change over time. As these changes occur, the processor 31 may constantly instruct that the database be updated. As the relative order in which connections are made by the cables does not change when cables are removed, the database within the data memory 34 for this information may only need to remove entries as cables are removed from the second element 60 and replaced at the first element 40. In alternative embodiments, the processor 91 of the second computer system 90 may instruct the recordation of the positions of the cables into the data memory 94. Such recordation may be in addition to recordation of the information into the data memory 34, as a backup system, or may be the only location the data is stored. In some embodiments, recordation of this information at the second computer system 90 may provide for remote wireless access to such information through the communication unit. In still further alternative embodiments, the recordation of the cable position information may be performed manually.

Figure 3A:
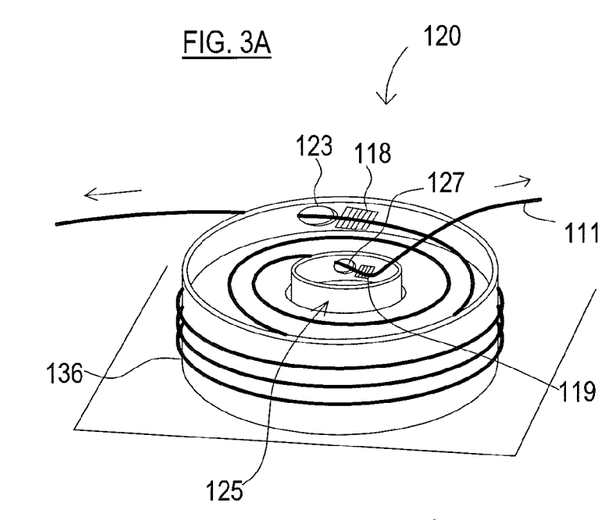
FIGS. 3A-3c are top perspective, bottom perspective, and side cross-sectional views of a spooling mechanism in accordance with another embodiment of the invention.
Figure 3B:
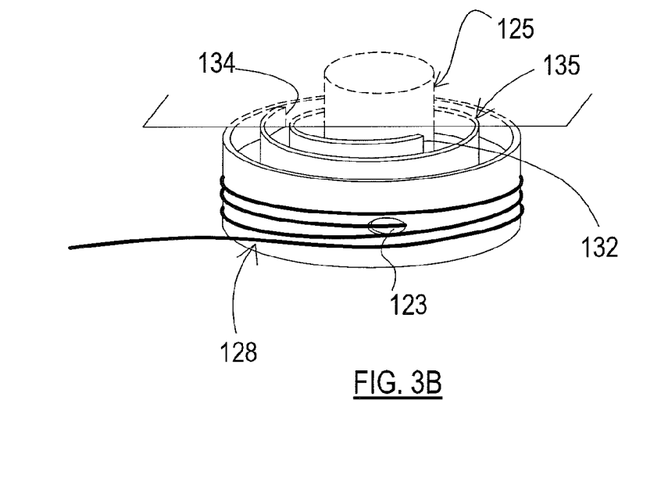
Figure 3C:
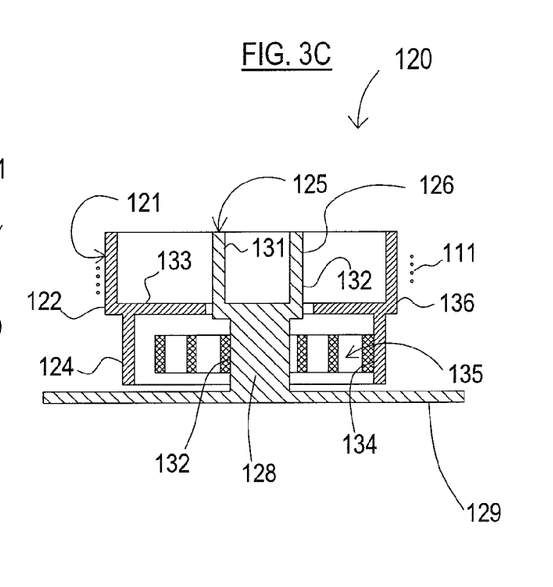

Referring now to FIGS. 3A-3C, in some embodiments, a spooling mechanism 120 may be used as the tensioning mechanism of the switching apparatus. As shown, the spooling mechanism 120 has a first ring 121 surrounding a second ring 125. The first ring 121 may have a central portion 133 separating a first part 122 and a second part 124 of the first ring 121. The central portion 133 may be in the shape of a disc having an aperture through which the second ring 125 extends. In this manner, the first ring 121 may be rotated about the second ring 125.

The second ring 125 may have a first part 126 surrounded by the first part 122 of the first ring 121 and extending from a second part 128 of the second ring 125. The second part 128 of the second ring 125 may be surrounded by the second part 124 of the first ring 121 and extend from a base 129 of the second ring 125. The base 129 may be affixed to any structure such that the second ring 125 remains static during rotation of the first ring 121. The base 129 may be substantially flat such that the first ring 121 may rotate about the second ring 125 near a surface of the base 129 without contacting the base 129. A coil spring 135 may be attached at an inner end 132 of the spring 135 to the second part 128 of the second ring 125 and attached at an outer end 134 of the spring 135 to the second part 124 of the first ring 121. In this manner, the spring 135 may be coiled about the second part 128 of the second ring 125 and interposed between the first ring 121 and the second ring 125.

As best shown in FIGS. 3A and 3C, a cable, such as the cable 111, may be connected at a junction (not shown) such that the cable 111 is fixed at one end. The cable 111 may pass from an inner part 131 of the second ring 125 through a hole 127 and may then be coiled around an outer part 132 of the second ring 125. The cable 111 may then pass through a hole 123 extending through the first part 122 of the first ring 121. The opposite end of the cable 111 may then be tightly wound around an outer part 136 of the first ring 121. An appropriate number of turns or windings of the cable 111 may be determined by a combination of the diameter of the first ring 121 and the length of cable required to enable the cable tip to move between the first and second elements of the switching apparatus. Finally, the cable may be passed through an additional hole, such as the hole of a first element of a switching apparatus as previously described herein. Moreover, this opposite end of the cable 111 may be attached to a connector such that the cable 111 cannot pass through the hole of the first element after the cable is passed through the hole.

In one embodiment, the cable 111 is coiled around the outer part 136 of the first ring 121 such that it contacts a substantial portion of the outer part 136 through a sequence of coils about the first part 122 of the first ring 121. In this manner, pulling the cable 111 may induce sufficient sliding friction between the cable 111 and the ring 121 to cause the first ring 121 to rotate about the second ring 125. Due to the attachment of the ring 121 to the spring 135 at the outer end 134 of the spring 135, rotation of the first ring 121 may then cause the outer end 134 of the spring 135 to rotate about the second ring 125. When the second ring 125 is fixed at its base 129 to another static structure, the inner end 132 of the spring 135 does not rotate with the outer end 134 of the spring 135 due to the fixation of the inner end 132 to the static second ring 125. In this manner, the rotation of the outer end 134 of the spring 135 due to the rotation of the ring 121 stretches the spring 135 to supply a tension force against the ring 121. The tension force acting against the ring 121, in turn, acts upon the cable 111 as a tension force such that the cable 111 is biased in a direction toward retracting to the spooling mechanism 120 and coiling about the spooling mechanism 120.

As shown in FIG. 3A, in some embodiments, a portion of a first tab 118 may be placed against the first ring 121 and another portion of the first tab 118 may be placed over a portion of the cable 111 adjacent to the hole 123. When using the first tab 118, the length of the cable 111 on the portion of the cable 111 that is not between the first tab 118 and the switching apparatus remains constant such that a given tensioning of the cable 111 causes the first ring 121 to rotate through a greater angular displacement in the direction of the coil of the cable 111 about the second ring 125 than when not using the first tab 118. In further embodiments, a portion of a second tab 119 may be placed against the second ring 125 and another portion of the second tab 119 may be placed over a portion of the cable 111 adjacent to the hole 127. Fixing the length of the cable 111 at the second tab 119 will prevent tensioning of the portion of the cable 111 not between the second tab 119 and the switching apparatus. The tabs 118 and 119 can be used separately or in conjunction with one another. Either or both of tabs 118 and 119 may be adhesive tape or other mechanism for fixing cable well-known in the art.

Figures 4A, 4B:
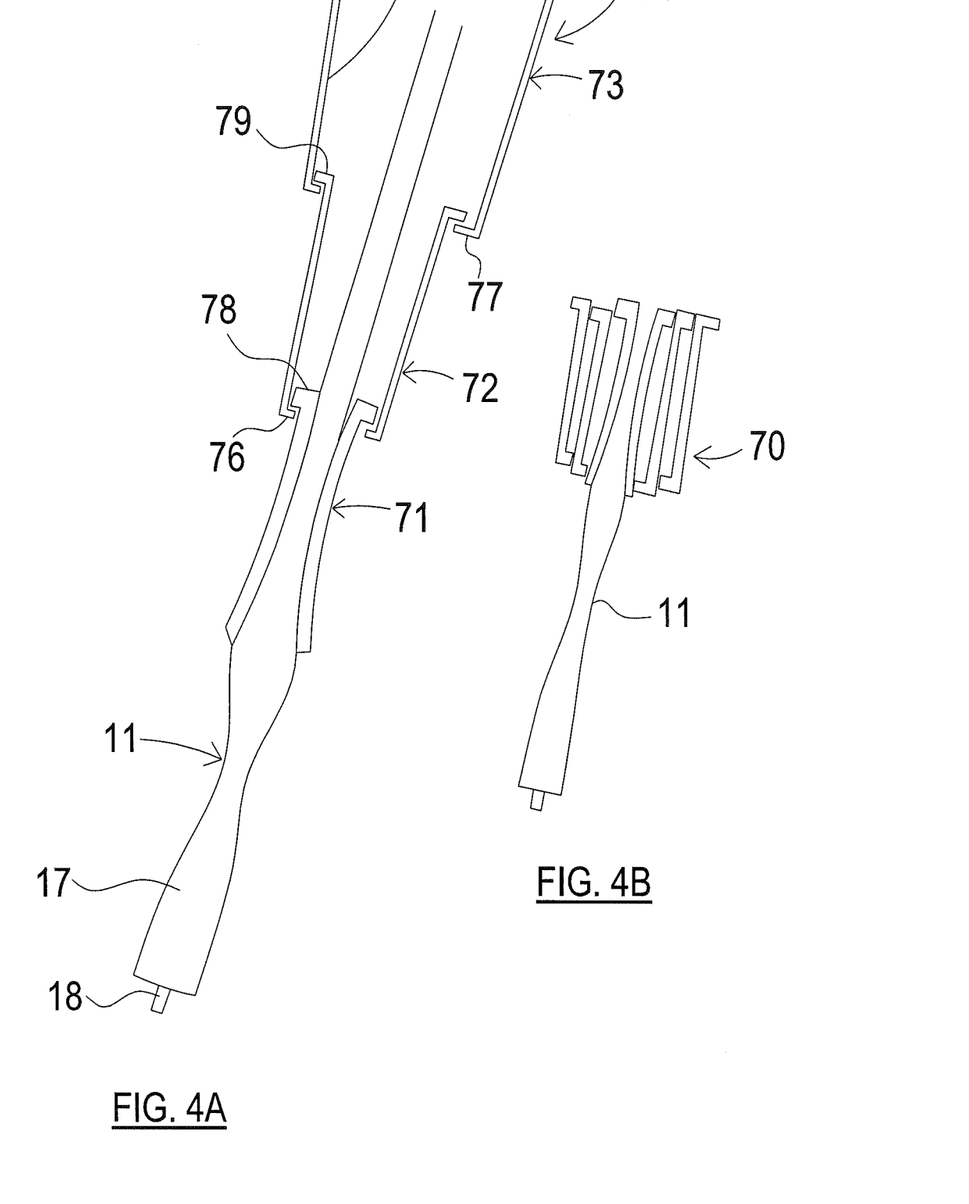
FIGS. 4A and 4B are side cross-sectional views of a cable and cable cover, shown in extended and retracted positions, respectively, in accordance with another embodiment of the invention.

In an alternative embodiment as shown in FIGS. 4A and 4B, a cable used in a switching apparatus, such as the cable 11 of FIG. 1, may have an extendable cable cover 70 for reducing the sliding friction during retraction of the cable when used in a switching apparatus. As shown in FIGS. 4A and 4B, the cable cover 70 may include first, second, and third segments 71-73 in which the third segment 73 overlaps a portion of the second segment 72, which overlaps a portion of the first segment 71, and in which each of the segments 71-73 may form a portion of an adjustable central cavity 74 through which the cable 11 may pass. The first segment 71, being nearest to the connector 16 of the cable 11, may slide within the second segment 72 and the second segment 72 may slide within the third segment 73 during retraction of the cable 11 toward the third segment. In contrast, the first segment 71 may extend from a small portion of the second segment 72 and the segment 72 may extend from a small portion of the third segment 73 during the retraction of the cable 11. A lip 76 of the first segment 71 and a lip 77 of the second segment 72 may engage corresponding flanges 78, 79 of the first and second segments 71, 72 to prevent separation of the first segment 71 from the second segment 72 and the segment 72 from the third segment 73 during extension of the cable 11 away from the third segment 73. Utilizing the segments, a predetermined portion of the cable 11 may be covered over a predetermined distance from the first element during both extension and retraction of the cable 11. As the segment adjacent to the cable 11, the portion of the central cavity 74 within the first segment 71 may tightly surround a predetermined portion of the cable 11. While any number of segments may be used on a cable in a switching apparatus, in preferred embodiments, the length of the segments provide that upon retraction of the cable, the connector, such as the connector 16 does not contact cables that remain connected within the switching apparatus.

Figure 5A:
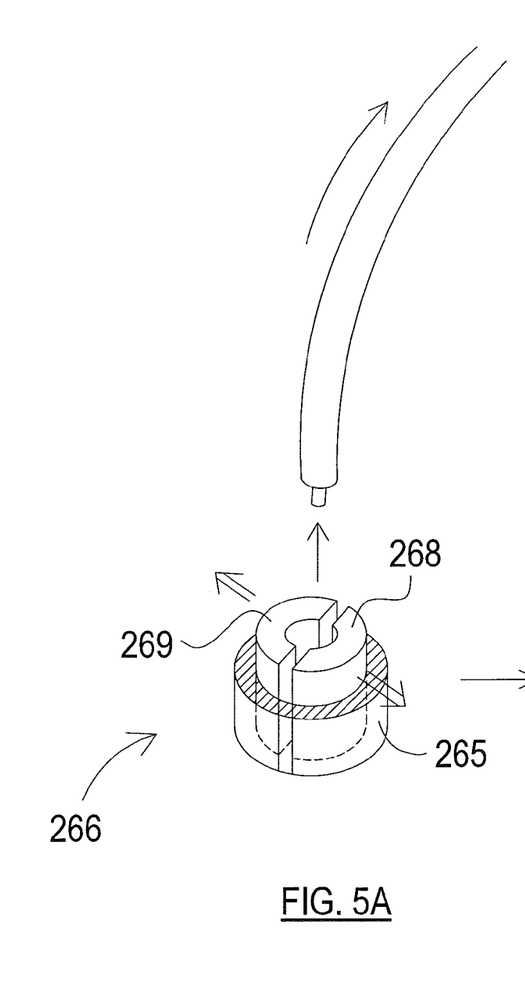
FIGS. 5A and 5B are top perspective and plan views of a coupling component in accordance with another embodiment of the invention.
Figure 5B:
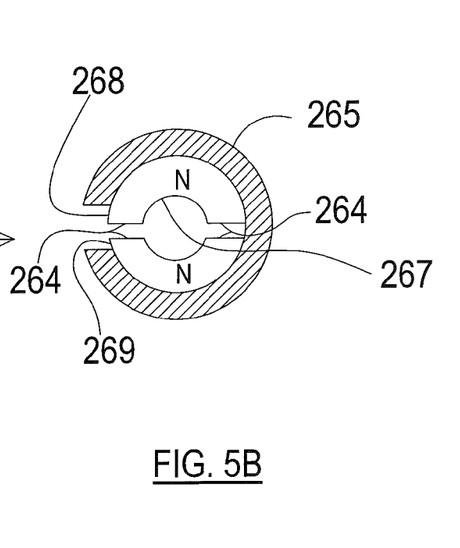

In some embodiments in accordance with the present invention, the connector interface as described previously herein may be replaced with a coupling component 266, as shown in the example of FIGS. 5A-5B, which may be seated into a second element, such as the second element 60 of the switching apparatus 10 shown in FIG. 1. The coupling component 266 may include opposing the first and second inner segments 268, 269 at least partially surrounded by a spring 265. The first and second inner segments 268, 269 may form an inner portion 267 when opposing faces 264 on each of the respective first and second inner segments 268, 269 oppose one another. The inner portion 267 may have a size and shape for allowing a cable such as the cables described previously herein to be placed in a compression or interference fit between the first and second inner segments 268, 269 for retaining a cable. To create such an interference fit, the spring 265 may be a compression spring that simultaneously contacts both the first and second inner segments 268, 269 of the coupling component 266. In this manner, when a cable is seated between the first and second inner segments 268, 269, the coupling component 266 maintains the position of the cable within the coupling component 266. The cable may then supply an electrical current through a tip of the cable to the coupling component 266.

As further shown in FIGS. 5A-5B, the first and second inner segments 268, 269 may be made of conductive materials such that upon the application of an electric charge to each of the inner segments 268, 269, the segments become polarized. In preferred embodiments, a control system such as that described previously herein may be in electrical communication with the inner segments 268, 269 such that the control system may instruct a supply of electrical charge to the inner segments or instruct that the supply of charge be shut off. Each of the segments 268, 269 may have the same polarity which, in embodiments exemplified in FIGS. 5A-5B, may cause the first and second inner segments 268, 269 to repel one another with a force greater than the compressive force of the spring 265. When the repelling force acting on the first and second inner segments 268, 269 is greater than the compressive force provided by the spring 265, the first and second inner segments 268, 269 may separate from each other such that a cable inserted within the coupling component 266 may be easily removed from the coupling component 266. In some embodiments, a portion of the removal of the cable from the coupling component 266 may be caused by tension in the cable produced by a spooling mechanism, such as the spooling mechanism 20 shown in FIG. 1. In one embodiment, the combination of the remote charging and discharging of the coupling component with a tensioning device may effect the releasing of cables from the second element of a switching apparatus.

In an alternative arrangement, wires (not shown) in electrical communication with a control system such as that described previously herein may be coiled around each of inner segments similar to those just described. In this manner, upon receiving an electrical current from the control system, these inner segments may produce a magnetic flux. In such embodiments, the control system may direct the application of the current through the wires to produce opposing magnetic forces between the inner segments. These forces may then work in combination with the compressive force exerted by a spring surrounding the inner segments in a manner similar to the spring 265 just described. Advantageously, in either of the arrangements of the inner segments just described, the default configuration of the coupling component and corresponding inner segments is to maintain compression against an inserted cable and accordingly maintain a connection with the cable.

Figure 6:
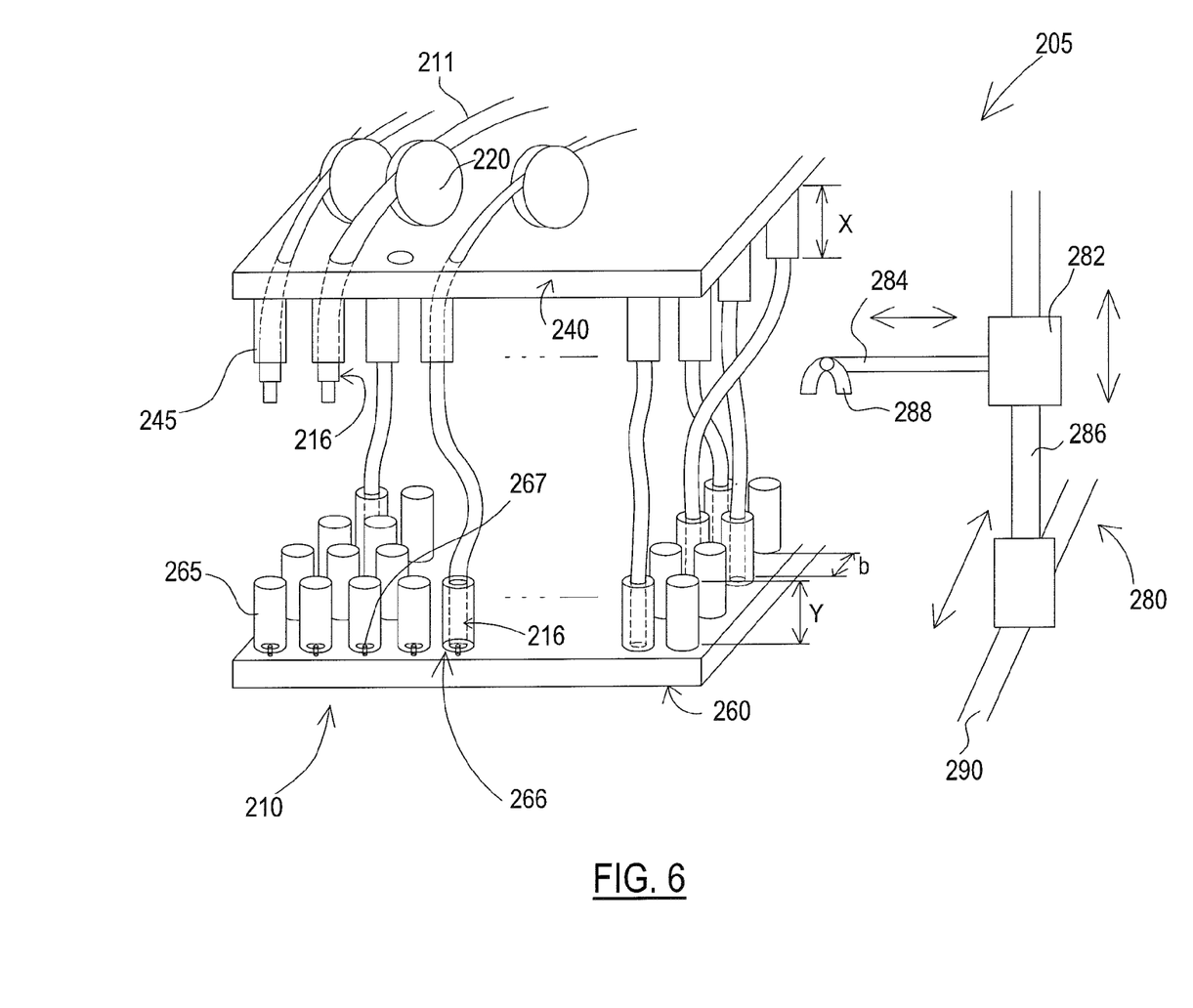
FIG. 6 is a perspective view of a portion of a switching system in accordance with another embodiment of the invention.

In another aspect of the invention as shown in the example of FIG. 6, an N×N switching system 205 may have a first element 240 opposing second element 260. The first element 240 is similar to the first element 40 shown in FIG. 1 except that the first element 240 has a two-dimension array of holes passing through the first element 240. As shown in FIG. 6, the holes within the first element 240 may be spaced a minimum distance from one another throughout the first element 240. In some embodiments, this minimum distance may be a uniform distance such that the holes are spaced evenly from one another. A plurality of spooling mechanisms 220 may supply a length of corresponding cables 211 to each of the holes through the first element 240 in a manner similar to the function of the switching apparatus 10 shown in FIG. 1. In this manner, tension provided by each of the spooling mechanisms 220 may hold connectors 216 on each of the cables 211 adjacent to the first element 240 when the cables and corresponding connectors are in a first position. As shown in FIG. 6, individual resting tubes 245 may abut the first elements 240 and provide a receptacle for the connectors 216 when in the first position.

The second element 260, as shown in FIG. 6, may have a two-dimensional array of connector interfaces 266 at least partially embedded therein that may receive the connectors 216 when the connectors 216 are pulled from their positions adjacent to the first element 240 to the second element 260. As further shown in FIG. 6, a plurality of guide tubes 265 may be placed over each of the connector interfaces 266 on the second element 260 such that the guide tubes 265 surround a portion of the connector interfaces 266 or a profile of these interfaces when the interfaces 266 are embedded in the second element 260 (not shown). The guide tubes 265 may allow an arm 284 and attached disengagement element 288, each described further herein, to move between the guide tubes 265 without contacting cables inserted into the guide tubes 265. In some embodiments, the guide tubes 265 may be elastic to allow the arm 284 or the disengagement element 288 to contact the guide tube 265 with a sufficient force to move the guide tube 265 such that the tube 265 contacts the connector 216 inserted therein to dislodge the connector 216 from the connector interface 266 within the guide tube 265. When any of the cables 211 is inserted into a predetermined connectors interface 266 (for example, by a control system, such as the control system 50 of FIG. 2), each of the guide tubes 265 may have a release mechanism 267 that, when pressed, applies a force sufficient to overcome a magnetic force of the connector interface 266 to disengage the cable 211 from the connector interface 266.

As further shown in FIG. 6, a control unit 280 may be used to engage any of the connectors 216 to move the connectors 216 from their respective positions adjacent to the first element 240 to predetermined positions within the array of the second element 260 when instructed by a control system. The control unit 280 may operate in a manner similar to the control unit 80 shown in FIG. 1 with the exception that, due to the larger dimensions of the arrays of the first and second elements 240, 260, the control unit 280 may be translated along a linear track 290 to accommodate the larger dimensions of the arrays. Movement along the track 290 by the control unit 280 may be caused by pneumatic or electromagnetic actuation, or may be chain-driven.

Figure 7A:
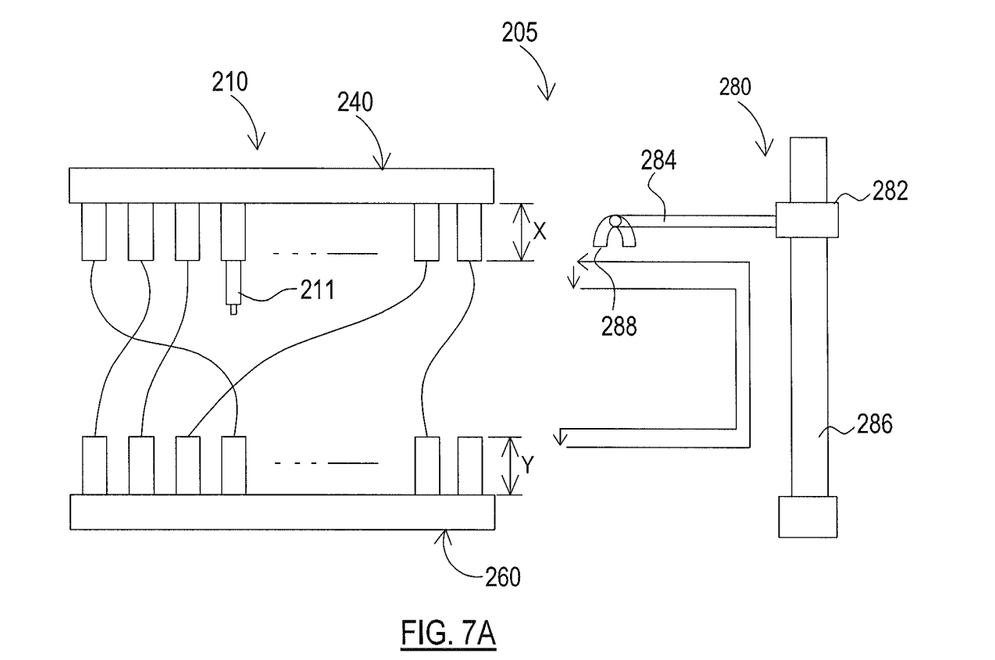
FIGS. 7A and 7B are illustrative examples of the movement of an engagement element within the switching system of FIG. 6.

Referring to FIG. 7A, a disengagement element 288 on an end of an arm 284 of the control unit 280 may engage any of the cables 211 adjacent to the first element 240 of the switching apparatus 210 as instructed by a control system, and may then pull the cable 211 to a position such that the engagement element 288 is below a plane through a furthest edge of the resting tubes 245 from the first element 240 and may then retract toward the control unit 280 to a position that is not between the first element 240 and the second element 260. In this manner, the arm 284 and its engagement element 288 may not contact any of the other cables within the switching apparatus 210 during the retraction toward the control unit 280. A control system may then instruct a motion box 282 of the control unit 280 to slide downward along a guide rail 286 to a position just above a horizontal plane through edges of the guide tubes 265 furthest from the second element 260. Once the control unit 280 is moved to a predetermined position along the track 290, the arm 284 of the control unit 280 may be extended to a position in which the cable engaged with the engagement element 288 is above a predetermined connector interface 266. The motion box 282 may then be further lowered to accordingly lower the tip of the cable 211 into the predetermined connector interface 266. In this manner, the arm 284 may not contact any of the cables within the switching apparatus 210 during its extension toward the predetermined connector interface 266.

Figure 7B:
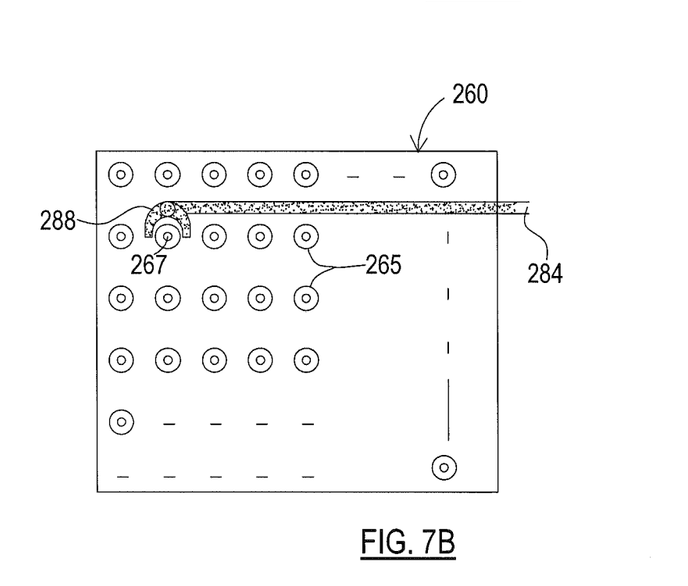

As shown in FIG. 7B, in the embodiment utilizing the guide tubes 265, the arm 284 may be extended when it is at a vertical position designated by "Y" as shown in FIG. 7A. In some embodiments, the guide tubes 265 are spaced apart from one another to allow the arm to be extended between the guide tubes 265 and to allow the engagement element 288 to rotate about the arm without contacting the guide tubes 265. Furthermore, such spacing may allow the arm 284 to be extended to a predetermined location adjacent to a predetermined connector interface having a guide tube placed thereupon and allow the engagement element 288 on the arm 284 to engage the release mechanism 267 without contacting any of the other guide tubes 265 or any of the cables within the switching apparatus 210.

Figure 8:
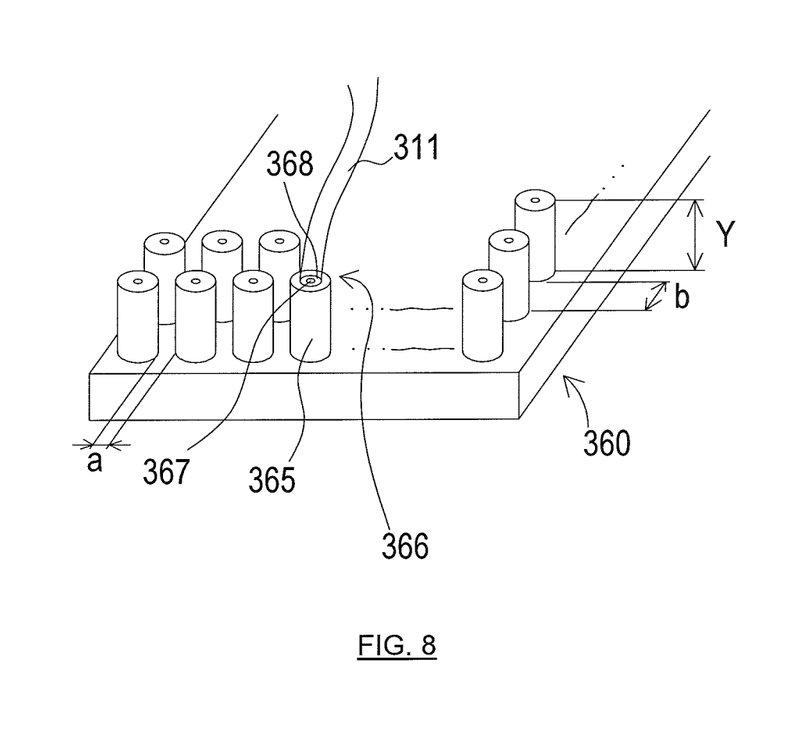
FIG. 8 is a perspective view of a portion of a switching system in accordance with another embodiment of the invention.

In some embodiments as illustrated by FIG. 8, a connecting pole 365 may be used in place of connector interfaces for combinations of connector interfaces and guide tubes as described previously herein. The connector poles 365 may be spaced about a second element 360 in a manner similar to the spacing of the guide tubes 265 about the second element 260 as shown in FIG. 6. Each of the connecting poles 365 may extend from the second element 360 toward an opposing first element (not shown). The connecting poles 365 may be made of any rigid material such as plastic or metal. The connecting poles 365 may be hollow or partially hollow, which may be caused by etching of a deep groove into the poles 365, to allow for the inclusion of a connector interface 366 on a surface of the connecting poles 365 nearest to the first element. The connector interface 366 may have an inner portion 367 for engaging the tip of a connector and may have a mating surface 368 surrounding the inner portion 367 for engaging the body of the connector in a manner similar to the engagement of a cable with the connector interface 66 shown in FIG. 1. In the arrangement of FIG. 8, an arm and attached disengagement element, such as the arm 284 and the disengagement element 288 as described above, may be moved to locations between the poles 365 as instructed by a control system, such as that described previously herein, without contacting or disturbing cables attached to the poles 365 until the arm or disengagement element is at the location of a predetermined connector to be moved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

In the Brief Summary of the Invention above, the Detailed Description of the invention herein, the claims below, and in the accompanying drawings, reference is made to particular features (e.g., method steps) of the invention. It is to be understood that the disclosure of the invention in this specification includes all possible combinations of such particular features. For example, where a particular feature is disclosed in the context of a particular aspect, arrangement, or embodiment of the invention, or a particular claim, that feature can also be used, to the extent possible, in combination with and/or in the context of other particular aspects, arrangements, and embodiments of the invention, and in the invention generally.

The invention claimed is:

1. A cover for an optical fiber, the optical fiber having a connector at an end adjacent to a predetermined portion of a length of the optical fiber, the cover comprising:
   a series of segments including a first segment and at least a second segment connected to and overlapping the first segment to allow the first segment to be moved into and extending away from the second segment, wherein the series of segments is adapted to receive the optical fiber extending therethrough, such that when the optical fiber is received in the series of segments, the first segment is adjacent to the connector at the end of the optical fiber and encloses the predetermined portion of the optical fiber.

2. An N×N switching apparatus for optical components comprising:
   an optical fiber covered by the cover of claim 1;
   a first element providing for a supply of a length of the optical fiber in tension therefrom including an interface component for maintaining an end of the optical fiber in tension at a first position; and
   a second element having a coupling component for detachably maintaining the end of the optical fiber at a second position, wherein the first and second elements are arranged such that the end of the optical fiber is movable between the first and second elements.

3. The switching apparatus of claim 2, wherein the coupling component of the second element is adapted to detachably maintain the end of the optical fiber in tension at the second position, and wherein a supplied length of optical fiber is in tension from the first element during movement of the end of the optical fiber between the first and second elements.

4. The switching apparatus of claim 3, wherein the coupling component includes a connecting pole extending from the second element, the coupling component being adapted to detachably maintain the end of the optical fiber at an end of the connecting pole.

5. The switching apparatus of claim 4, further comprising:
a supply means that engages the optical fiber at a second side of the first element opposite the first side to hold the optical fiber in tension thereagainst.

6. The switching apparatus of claim 2, the first element having a plurality of interface components for maintaining a plurality of ends of optical fibers in tension in respective first positions against the first element, and
the second element having a plurality of coupling components for maintaining at least some of the plurality of ends of optical fibers in respective second positions, wherein the ends of the optical fibers are movable between the first and second elements,
wherein, when the plurality of ends of optical fibers are in the first position, the plurality of ends are spaced a minimum distance from one another.

7. The switching apparatus of claim 6, wherein when the plurality of ends of optical fibers are in the first position, the plurality of ends are spaced the same minimum distance from one another.

8. The switching apparatus of claim 2, the second element further having at least one guide element extending therefrom toward the first element,
wherein the guide element surrounds at least a profile of the coupling component and is adapted to receive the end of the optical fiber when an optical fiber is being moved to the second position, and
wherein the guide element has a release mechanism which, when activated with an optical fiber maintained at the second position, causes the end of the optical fiber to detach from the second element.

9. The switching apparatus of claim 2, the coupling component comprising:
a retainer attached to the second element; and
opposing elements within the retainer, the retainer adapted for supplying a force to force the opposing elements toward each other, and the opposing elements further adapted for seating the end of the optical fiber therebetween and for moving away from each other in response to a magnetic polarization of the opposing elements,
wherein, in a first state of the retainer with the opposing elements not polarized and the end of the optical fiber between the opposing elements, the opposing elements maintain the end of the fiber seated therebetween, and when the end of the optical fiber is between the opposing elements, in a second state of the retainer with the opposing elements polarized, the opposing elements move away from each other to allow the end of the optical fiber to move freely.

10. The switching apparatus of claim 9, the second element further having at least one guide element extending therefrom toward the first element,
wherein the guide element surrounds the retainer and is adapted to receive the end of the optical fiber when an optical fiber is being moved to the retainer, and
wherein the guide element has a release mechanism which is adapted to cause the retainer to change between the first state and the second state.

11. The switching apparatus of claim 2, further comprising apparatus for supplying a length of fiber to the first element, the fiber having a first end fixed in position and a second end opposite the first end, the supply apparatus comprising:
an inner ring held in a fixed position and adapted to receive a first portion of the fiber therethrough and around a circumference thereof;
an outer ring adapted to rotate about the inner ring and to receive a second portion of the fiber therethrough and around a circumference thereof; and
a resilient member attached at a first end to the inner ring and attached at a second end to the outer ring, wherein, when the fiber is received by the inner and outer rings, the resilient member is in a first state when a third portion of the fiber including the second end extends from the outer ring has a first length and a second state when the third portion of the fiber has a second length greater than the first length.

12. The switching apparatus of claim 2, wherein the end of the optical fiber, when at the first position, is held against a first side of the first element.

13. The cover of claim 1, wherein when the optical fiber is received in the series of segments, the first segment tightly surrounds at least a part of the predetermined portion of the optical fiber.

14. A switching system for optical components comprising:
a predetermined optical fiber covered by the cover of claim 1; and
a control unit to control (i) engagement of an engagement element with an end of the predetermined optical fiber, the optical fiber adapted for coupling to an N×N optical switch under tension force, the switch being coupled to a plurality of optical fibers including the predetermined optical fiber, and (ii) movement of the engagement element engaged with the end of the predetermined optical fiber against the supplied tension force between a predetermined first position to a predetermined second position of the optical switch, wherein the tension force is maintained during the movement.

15. The switching system of claim 14, wherein the control unit records the predetermined second location of the predetermined optical fiber.

16. The switching system of claim 14, wherein the control unit records a predetermined order of movement by the engagement element of the optical fibers moved to the respective predetermined second positions.

* * * * *